United States Patent Office 3,598,816
Patented Aug. 10, 1971

3,598,816
TETRAHYDROPYRANYLETHERS OF STEROIDS
AND PROCESS FOR THEIR MANUFACTURE
Werner Haede, Hofheim, Taunus, Werner Fritsch, Neu-
enhain, Taunus, and Ulrich Stache, Gerhard Vogel,
Hofheim, Taunus, and Kurt Radscheit, Kelkheim,
Taunus, Germany, assignors to Farbwerke Hoechst Ak-
tiengesellschaft vormals Meister Lucius and Bruning,
Frankfurt am Main, Germany
No Drawing. Filed Sept. 13, 1967, Ser. No. 667,368
Claims priority, application Germany, Oct. 13, 1966,
F 50,421; Apr. 29, 1967, F 52,300
Int. Cl. C07c 173/00
U.S. Cl. 260—239.55
10 Claims

ABSTRACT OF THE DISCLOSURE

Tetrahydropyranyl ethers of steroids having gestagenic, antiphlogistic, anabolic, or androgenic action, said ethers being of the formula

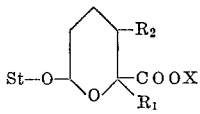

wherein $R_1$ is hydrogen or lower alkyl; $R_2$ is hydrogen, alkyl or alkenyl; and X is hydrogen, alkyl, alkenyl, aryl, aralkyl, or a cation; and St is a radical of an androstane, androstene, pregnane, pregnene, or pregnadiene, or of a halo-derivative thereof, or of a cardenolide or bufadienolide.

---

The present invention relates to tetrahydropyranylethers of steroids of the General Formula I

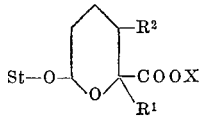

in which St represents a steroid radical, $R^1$ represents H or lower alkyl; $R^2$ represents H, alkyl, or alkenyl; and X represents H, alkyl, aryl, aralkyl, or a cation. To prepare the ethers, steroids carrying hydroxyl groups capable of being esterified are reacted with dihydropyrane derivatives of the General Formula II

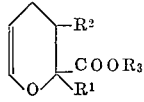

in which $R^1$ and $R^2$ have the meaning given above, and $R^3$ represents an alkyl, aryl or aralkyl radical, in the presence of an acid catalyst and, if desired, the tetrahydropyranyl ether formed is hydrolyzed in an alkaline medium. If $R^2$ represents a hydrogen atom or an alkyl radical and $R^3$ a benzyl radical, the benzyl radical is split off by catalytic hydrogenation. If desired, the acid obtained can be converted into its salt with an equivalent amount of a base.

For the reaction, all steroids carrying hydroxyl groups capable of being esterified are suitable. The hydroxyl groups may be in 3, 5, 6, 12, 14, 15, 16, 17 or 21-position. Even several hydroxyl groups can be reacted.

Furthermore, even in steroids carrying several hydroxyl groups which are distinguished by a graduated reactivity, only one hydroxyl group can be reacted by proper choice of the reaction conditions. For example 3- or 21-hydroxyl groups can be reacted preferably, without considerable reaction of the 17α- or 11β-hydroxyl group, if the dihydropyrane carboxylic acid ester quantity calculated for each hydroxyl group which is to react is used and working is carried out under mild conditions, for example by using small quantities of a catalyst and by working at low temperatures.

Alcohols of the following steroids can be used as reagents, for example: androstane; androstene; pregnane; and pregnadiene; as well as the 4-, 6-, or 9-halogen derivatives of these compounds. They are used, preferably: Δ4-androstene-17β-ol-3-one, Δ4 - pregnene-21-ol-3,20-dione; Δ4 - pregnene - 11β, 17α, 21-triol-3,20-dione, Δ1,4pregnadiene-11β- 17α, 21-triol-3,20-dione, androstane-17β-ol-3-one, Δ5-androstene-3β-ol-17-one, pregnane-3-ol-20-one, Δ5-pregnene-3β-ol-20-one or Δ5,14-pregnadiene-3β-ol-20-one and furthermore 4-, 5-, 6- or 9-halogen derivatives of the mentioned compounds as well as their 6- or 16 alkyl- and 6- or 16-methylene derivatives. Furthermore, hydroxy-cardenolides and hydroxybufadienolides can be used.

For the variation of the process involving splitting off of the benzyl radical by catalytic hydrogenation, only those unsaturated steroids can be used as starting substances which do not contain a conjugated double bond in the steroid structure.

The dihydropyrane derivatives used have been prepared according to J. Am. Chem. Soc. 73, 5270 (1951) or analogous procedures. The reaction between the steroid alcohol and the dihydropyrane derivative is carried out suitably at low temperature, e.g. at about 0° C. to 40° C. Preferably, working is carried out at room temperature. The reaction time lies between 1 hour and several days and depends on the reactivity of the steroid hydroxyl groups which are to be esterified. Preferably, reaction is carried out in the presence of solvents. As such solvents, inert organic solvents, suitably ethers, in particular cyclical ethers such as tetrahydrofurane or dioxane, are used. For example dimethylformamide or dimethylsulfoxide can also be used.

As acid catalysts, acids can be used, preferably strong acids such as p-toluene sulfonic acid, hydrochloric acid or sulfuric acid. Furthermore, acid halides, in particular halides of phosphorus or sulfur, such as phosphorus oxychloride for example, can be used.

Working up of the reaction mixture is carried out by adding a base such as pyridine diluted with water. The tetrahydropyranylether formed is filtered if the reaction has been carried out in a solvent which can be mixed with water. Otherwise, the reaction mixture is preferably separated and the solvent is evaporated under reduced pressure. The reaction mixture can also be added directly into alkali-containing water and the aqueous solution can be worked up as described above.

In order to obtain the free acid (Formula I:X=H), the ester formed is hydrolyzed for example with alkali, and the acid obtained from the aqueous solution of its alkali metal salt is isolated by adding organic acids such as acetic acid or formic acid or dilute mineral acids such as hydrochloric acid or sulfuric acid.

For splitting off benzyl by hydrogenation if $R_3$ represents a benzyl radical, metals of the 8th group of the Periodic System, preferably palladium, can be used as catalysts.

As solvents, the inert organic solvents usually employed for hydrogenation, or mixtures thereof, can be used, such as low molecular weight alcohols, especially ethanol or isopropanol, or ethers such as diethylether, tetrahydrofurane or dioxane.

The reaction conditions are those which are usual for hydrogenation. The process is suitably performed at normal pressure and at low temperatures, between about 0 and 50° C., preferably at room temperature.

If the molecule contains other sites which can undergo hydrogenation, it is suitable to use only a molar equivalent of hydrogen referred to the starting substance. This is rapidly absorbed. The reaction period depends on the amount of catalyst used and amounts generally to between some minutes and some hours.

For the preparation of aqueous solutions of salts of the acids obtained, for which preferably alkali metal salts (such as Na or K) but also alkaline-earth salts or ammonium salts can be used, equivalent amounts of bases in aqueous solution are added to the acid. The solution has a good stability at pH between 8 and 12.

The products of the process can be used as such or in the form of their corresponding salts with bases in admixture with pharmaceutically suitable carriers. The mode of application may be parenteral, oral or, in the form of ointments, also external. When parenterally applied, aqueous solution can be administered subcutaneously or intramuscularly. In ointments, the carriers usual for ointments are used.

The products of the present invention are, corresponding to nature of the steroid radical, pharmaceutically most important compounds with valuable properties such as gestagenic, antiphlogistic, anabolic or androgenic action. For example the alkali metal salts (X=Na or K), in addition to their pharmacological properties which depend on the nature of the steroid radical, are distinguished by excellent water-solubility and stability of their aqueous solutions in the neutral and alkaline range. The esters (X=alkyl, aryl or aralkyl radical) are distinguished by an increased solubility in oil.

The following examples serve to illustrate the invention but they are not intended to limit it.

EXAMPLE 1

Tetrahydro-6'-($\Delta$1,4-pregnadiene-11$\beta$, 17$\alpha$, diol-3,20-dione-21-oxy)-pyrane-2'-methyl-2'-carboxylic acid 5 grams of $\Delta$1,4-pregnadiene-11$\beta$, 17$\alpha$, 21-triol-3,20-dione are suspended in 25 grams of tetrahydrofurane. 0.015 cc. of phosphorus oxychloride is added to this suspension while excluding moisture and stirring. Then 2.3 of 2-carbomethoxy-2-methyl-3,4-dihydro-2H - pyrane (prepared according to J. Am. Chem. Soc. 73, 5270 (1951)), are added dropwise within 5 hours while continuously stirring. During this process the steroid is dissolving. Then one drop of pyridine is added and the reaction mixture is poured into 100 cc. of 1 N soda solution. In this process part of the tetrahydropyranylether formed precipitates. The precipitation is completed by evaporating the tetrahydrofurane under reduced pressure at a bath temperature of 60° C. The amorphous precipitate can be filtered with suction. After washing with water and drying in a vacuum desiccator 7 grams of the pyranylether are obtained. For the preparation of the free acid, the 7 grams obtained are boiled in 100 cc. of methanol with 20 cc. of a 2 N solution of caustic soda for 6 hours under reflux. Then 100 cc. of water are added and the methanol is evaporated under reduced pressure. The clear aqueous solution is allowed to cool and acidified with 2 N hydrochloric acid. During this process the carboxylic acid precipitates. After filtration, washing with water and drying in a vacuum desiccator 5 grams are obtained (melting point 115–124° C.).

EXAMPLE 2

Tetrahydro - 6' - (6$\alpha$-methyl-$\Delta$1,4-pregnadiene-11$\beta$, 17$\alpha$-diol-3,20-dione-21-oxy) - pyrane - 2' - methyl - 2' - carboxylic acid 30 grams of 6$\alpha$-methyl-$\Delta$1,4-pregnadiene-11$\beta$, 17$\alpha$, 21-triol-3,20-dione are suspended in 120 cc. of tetrahydrofurane and, after addition of 0.1 cc. of phosphorus oxychloride, 13 cc. of 2-carbomethoxy-2-methyl-3,4-dihydro-2H-pyrane are added within 5 hours. Small amounts of steroids which have not reacted are filtered with suction and the solutions are poured into 1 liter of 0.1 N soda solution. Further treatment is carried out analogous to Example 1. 31.5 grams of carboxylic acid are obtained as an amorphous precipitate. For the preparation of the sodium salt the 31.5 grams obtained are dissolved in 200 cc. of water with 68 cc. of caustic soda solution and lyophilized. 33 grams of sodium salt are obtained (melting point 220° C. with decomposition).

EXAMPLE 3

Tetrohydro-6'-($\Delta$4-pregnene-3,20-dione-17$\alpha$-oxy)-pyrane-2'-methyl-2'-carboxylic acid 1 gram of $\Delta$4-pregnene-17$\alpha$-ol-3,20-dione is stirred for 90 hours with 1 cc. of 2-carbomethoxy-2-methyl-3,4-dihydro-2H-pyrane and 0.01 cc. of phosphorus oxychloride in 5 cc. of tetrahydrofurane. Further treatment is carried out analogous to Example 2. 0.45 gram of carboxylic acid is obtained (melting point 125–135° C.). (IR–maxima at 1650, 1700, 1730 and 2940 cm.$^{-1}$).

EXAMPLE 4

Tetrahydro-6'-($\Delta$4-androstene-3-one-17$\beta$-oxy)-pyrane-2'-methyl-2'-carboxylic acid 1 gram of $\Delta$4-androstene-17$\beta$-ol-3-one is stirred for 5 hours with 0.01 cc. of phosphorus oxychloride and 0.65 cc. of 2-carbomethoxy-2-methyl-3,4-dihydro-2H-pyrane in 4 cc. of tetrahydrofurane. Further treatment is carried out analogous to Example 2. 1.4 grams of carboxylic acid are obtained (melting point 100–104° C.). (IR–maxima at 1650, 1670, 1730 and 2940 cm.$^{-1}$).

EXAMPLE 5

Tetrahydro-6'-($\Delta$5-pregnene-20-one-3$\beta$-oxy)-pyrane-2'-methyl-2'-carboxylic acid methyl ester 2 grams of $\Delta$5-pregene-3$\beta$-ol-20-one are stirred for 5 hours at room temperature with 0.02 cc. of phosphoroxy chloride and 1.3 cc. of 2-carbomethoxy-2-methyl-3,4-dihydro-2H-pyrane in 8 cc. of tetrahydrofurane. The solution which has formed during this process is poured into 100 cc. of water containing a few drops of soda solution. The crude ester product (Formula I: X=CH$_3$) precipitates in crystalline form. 3 grams are obtained (melting point 100–110° C. (IR–maxima at 1145, 1700, 1730 and 2935 cm.$^{-1}$).

EXAMPLE 6

Tetrahydro - 6' - ($\Delta$1,4-pregnadiene-11$\beta$-17$\alpha$-diol-3,20-dione-21-oxy) - pyrane - 3' - ($\beta$-methylvinyl) - 2' - carboxylic acid methyl ester 2 - carbomethoxy - 3-($\beta$-methylvinyl)-3,4-dihydro-2H-pyrane is prepared as follows: 84 grams of acrolein and 126 grams of sorbic acid methyl ester are heated for 2 hours to 190° C. in a vibrating autoclave with 3 grams of hydroquinone under 5 atmospheres of nitrogen. Then the reaction mixtures is distilled off (boiling at 145–150° C. under a pressure of 30 mm. of mercury (115 g.).

3 cc. of this dihydropyrane derivative are stirred for 3 days with 5 grams of $\Delta$1,4-pregnadiene-11$\beta$,17$\alpha$,21-triol-3.20-dione and 0.025 cc. of phosphoroxy chloride in 15 cc. of tetrahydrofurane. The reaction solution is poured into 100 cc. of water containing 5 cc. of 2 N soda solution after filtration of the steroid which has not reacted. The amorphous precipitate which forms is filtered, washed with water and dried in high vacuum. The yield amounts to 4.6 grams. The free carboxylic acid is obtained by hydrolysis as described in Example 2 (melting point 180–190° C.).

EXAMPLE 7

Tetrahydro - 6' - (6$\alpha$-9$\alpha$-difluoro-16$\alpha$-methyl-$\Delta$1,4-pregnadiene-11$\beta$-17$\alpha$-diol-3,20-dione-21-oxy) - pyrane - 2'-methyl-2'-carboxylic acid methyl ester 100 mg. of 6$\alpha$,9$\alpha$-difluoro-16$\alpha$-methyl-$\Delta$1,4-pregnadiene-11$\beta$, 17$\alpha$, 21-triol-3,20-dione are suspended in 1 cc. of tetrahydrofurane. To this suspension 0.0415 cc. of 2-carbomethoxy-2-methyl-3.4-dihydro-2H-pyrane (prepared according to J. Am. Chem. Soc. 73, 5270 (1951) and 0.005 cc. of phosphorus oxychloride are added while stirring and under a nitrogen atmosphere. While stirring, the suspension dissolves after about half an hour. The reaction mixture is left standing for two hours at room temperature and then 10 cc. of ice water and 0.5 cc. of 2 N sodium carbonate solution are added. The tetrahydropyranyl ether which has formed precipitates in amorphous form. The precipitate is dissolved in ether, the solvent is evaporated and the ether residue is heated to 80° C. at 0.1 mm. of Hg.

Yield: 135 mg. (IR–maxima at 1060, 1130, 1620, 1650, 1720, 2940, and 3460 cm.$^{-1}$; UV: $\epsilon$max, 237: 18400).

EXAMPLE 8

Tetrahydro - 6' - (6$\alpha$-methyl-9$\alpha$-fluoro-$\Delta$1,4-pregnadiene-11$\beta$,17$\alpha$-diol-3,20-dione 21-oxy) - pyrane - 2' - methylcarboxylic acid methyl ester 200 mg. of 6$\alpha$-methyl-9$\alpha$-fluoro-$\Delta$1,4-pregnadiene-11$\beta$, 17$\alpha$, 21-triol-3,20-dione are suspended in 2 cc. of tetrahydrofurane and 0.12 cc. of 2-carbomethoxy-2-methyl-3,4-dihydro-2H-pyrane (prepared according to J. Am. Chem. Soc. 73, 5270 (1951) and 0.006 cc. of phosphorus oxychloride are added. The whole is stirred for 2 hours at room temperature. After working up as described in Example 7, there are obtained 270 mg. of the above-described tetrahydropyranylether (IR–maxima at 1060, 1125, 1610, 1655, 1720, 2940 and 3460 cm.$^{-1}$; UV: $\epsilon$max. 238: 15000).

EXAMPLE 9

(a) Tetrahydro - 6' - ($\Delta\alpha,\beta$-$\beta$[5$\beta$,14$\beta$-androstane-14$\beta$-ol - 17$\beta$-yl] - butenolide - 3$\beta$ - oxy) - pyrane - 2' - methyl-2'-carboxylic acid methyl ester The 2-carbobenzyloxy-2-methyl-3,4-dihydro-2H-pyrane used as starting material is prepared as follows: 56 g. of acrolein and 100 g. of methacrylic acid benzyl ester are heated to 180° C. for 2 hours with 1.5 g. of hydroquinone under a nitrogen pressure of 20 atmospheres and the whole is then distilled. Boiling point: 108–110° C. under a pressure of 0.05 mm. of mercury.

To 275 mg. of this dihydropyrane derivative, 400 mg. of digitoxigenine in 4 cc. of tetrahydrofurane are added together with 0.01 cc. of phosphorus oxychloride and the whole is stirred for 4 hours at room temperature. Then 10 cc. of ether are added and the reaction mixture is extracted with dilute soda solution. The ethereal layer is separated, dried with sodium sulfate, filtered and concentrated. The residue is digested with water and filtered off. There is obtained an amorphous product melting at 48–53° C.

IR–maxima at 1015, 1060, 1140, 1440, 1610, 1725, 1775, 2930 and 3470 cm.$^{-1}$).

(b) Tetrahydro - 6' - ($\Delta\alpha,\beta$ - $\beta$[5$\beta$,14$\beta$ - androstane-14$\beta$ - ol - 17$\beta$ - yl] - butenolide - 3$\beta$ - oxy) - pyrane - 2'-methyl-2'-carboxylic acid 450 mg. of tetrahydro - 6'-($\Delta\alpha,\beta$-$\beta$[5$\beta$,14$\beta$-androstane-14$\beta$-ol-17$\beta$-yl]-butenolide-3$\beta$-oxy) - pyrane-2'-methyl-2'-carboxylic acid benzyl ester are hydrogenated under normal pressure at room temperature in 20 cc. of dioxane in the presence of 0.45 g. of palladium black.

After filtration of the catalyst a solution of 70 mg. of sodium bicarbonate in 2 cc. of water is added and the solution is concentrated under reduced pressure in a rotation evaporator and extracted with ether. The aqueous solution is acidified with dilute hydrochloric acid whereby the acid product precipitates. It is filtered off with suction and dried in a desiccator. Melting point: 75–80° C.

(IR–maxima at 1015, 1060, 1140, 1440, 1610, 1725, 1775, 2930 and 3470 cm.$^{-1}$).

What we claim is:

1. Tetrahydro - 6' - ($\Delta$1,4-pregnadiene-11$\beta$-17$\alpha$-diol-3,20-dione-21-oxy)-pyrane-2'-methyl-2'-carboxylic acid.

2. Tetrahydro - 6' - (6$\alpha$-methyl-$\Delta$1,4-pregnadiene-11$\beta$, 17$\alpha$ - diol - 3,20 - dione-21-oxy)-pyrane-2'-methyl-2'-carboxylic acid.

3. Tetrahydro - 6' - ($\Delta$4-pregnene-3,20-dione-17$\alpha$-oxy)-pyrane-2'-methyl-2'-carboxylic acid.

4. Tetrahydro - 6' - ($\Delta$4-androstene-3-one-17$\beta$-oxy)-pyrane-2'-methyl-2'-carboxylic acid.

5. Tetrahydro - 6' - ($\Delta$5-pregnene-20-one-3$\beta$-oxy)-pyrane-2'-methyl-2'-carboxylic acid methyl ester.

6. Tetrahydro - 6' - ($\Delta$1,4-pregnadiene-11$\beta$,17$\alpha$-diol-3, 20-dione-21-oxy) - pyrane - 3' - ($\beta$-methylvinyl)-2'-carboxylic acid methyl ester.

7. Tetrahydro - 6' - (6$\alpha$,9$\alpha$ - difluoro-16$\alpha$-methyl-$\Delta$1,4-pregnadiene - 11$\beta$,17$\alpha$-diol-3,20-dione-21-oxy)-pyrane-2'-methyl-2'-carboxylic acid methyl ester.

8. Tetrahydro - 6' - (6$\alpha$-methyl-9$\alpha$-fluoro-$\Delta$1,4-pregnadiene - 11$\beta$,17$\alpha$ - diol - 3,20 - dione - 21 - oxy) - pyrane-2'-methyl-carboxylic acid methyl ester.

9. Tetrahydro - 6' - ($\Delta\alpha,\beta$-$\beta$[5$\beta$,14$\beta$-androstane-14$\beta$-ol-17$\beta$-yl]-butenolide-3$\beta$-oxy) - pyrane - 2' - methyl - 2'-carboxylic acid methyl ester.

10. Tetrahydro - 6' - ($\Delta\alpha,\beta$-$\beta$[5$\beta$,14$\beta$-androstane-14$\beta$-ol - 17$\beta$ - yl] - butenolide - 3$\beta$ - oxy) - pyrane - 2' - methyl-2'-carboxylic acid.

References Cited

Dyerassi, "Steroid Reactions," Holden-Day, Inc., San Francisco (1963), pp. 76 and 79 relied on.

ELBERT L. ROBERTS, Primary Examiner

U.S. Cl. X.R.

260—239.57